United States Patent [19]
Kosin et al.

[11] Patent Number: 4,883,533
[45] Date of Patent: Nov. 28, 1989

[54] MODIFIED SYNTHETIC HYDROTALCITE

[75] Inventors: John A. Kosin, Bel Air; Barry W. Preston, Whiteford; David N. Wallace, Elkton, all of Md.

[73] Assignee: J. M. Huber Corporation, Locust, N.J.

[21] Appl. No.: 214,963

[22] Filed: Jul. 5, 1988

[51] Int. Cl.$^4$ .......... C08K 3/32; C09D 5/18; C01B 25/32; C01B 25/36
[52] U.S. Cl. .......... 106/18.14; 106/415; 106/462; 423/307; 423/308; 524/417
[58] Field of Search .......... 106/462, 415, 18.14; 423/307, 308; 524/417

[56] References Cited

U.S. PATENT DOCUMENTS

| | | |
|---|---|---|
| 3,539,306 | 11/1970 | Kumura et al. |
| 3,650,704 | 3/1972 | Kumura et al. |
| 3,879,525 | 4/1975 | Miyata et al. .......... 106/453 |
| 4,085,088 | 4/1978 | Miyata et al. |
| 4,154,718 | 5/1979 | Miyata et al. .......... 524/408 |
| 4,251,430 | 2/1981 | Skipton et al. .......... 523/514 |
| 4,324,876 | 4/1982 | Mitsuura et al. |
| 4,347,353 | 8/1982 | Miyata et al. |
| 4,351,814 | 9/1982 | Miyata et al. |
| 4,427,816 | 1/1984 | Aoki et al. .......... 524/358 |
| 4,514,389 | 4/1985 | Miyata .......... 424/128 |
| 4,533,525 | 8/1985 | Minamide et al. .......... 106/462 |
| 4,560,545 | 12/1985 | Spickett et al. .......... 424/156 |
| 4,611,024 | 9/1986 | Wolfe . |
| 4,629,626 | 12/1986 | Miyata et al. .......... 424/147 |
| 4,686,791 | 8/1987 | Miyata .......... 524/437 |
| 4,729,854 | 3/1988 | Miyata et al. .......... 524/436 |
| 4,732,939 | 3/1988 | Hoshi et al. .......... 524/436 |

*Primary Examiner*—Herbert J. Lilling
*Attorney, Agent, or Firm*—Harold H. Flanders; Alec H. Horn; Robert L. Price

[57] ABSTRACT

A phosphate-containing synthetic hydrotalcite of the following empirical formula:

$$x\text{MgO} \cdot \text{Al}_2\text{O}_3 \cdot y\text{PO}_4 \cdot z\text{H}_2\text{O}$$

wherein, x, y and z are integers indicating the number of moles present of MgO, PO$_4$ and H$_2$O, respectively. The phosphate-containing hydrotalcite being prepared by the addition of sufficient phosphoric acid to the reaction mixture to liberate carbon dioxide. The phosphate-containing hydrotalcite improves the flame retardant characteristics by providing char promotion to the system.

4 Claims, No Drawings

MODIFIED SYNTHETIC HYDROTALCITE

TECHNICAL FIELD

This invention relates to novel synthetic hydrotalcite, procedures for the preparation of synthetic hydrotalcite, and also relates to use of those products as fire retardant compositions and reinforcing agents in plastics and elastomers.

BACKGROUND ART

Hydrotalcite is a known natural mineral which is produced in relatively small amounts in limited areas. Hydrotalcite is known as an antacid which has a neutralizing effect on gastric juices. It is also known to produce synthetic hydrotalcites by the reaction of a carbonate source, a magnesium source, and an aluminum source. U.S. Pat. Nos. 3,539,306 and 3,650,704 to Kumura et al discloses synthetic hydrotalcites and methods for manufacture of the synthetic hydrotalcites. The synthetic hydrotalcite is described as having the following composition:

$$Al_2O_3.6MgO.CO_2.12H_2O.$$

According to these patents, the hydrotalcite is produced by reaction of an aluminum component, which can be a water soluble aluminate, a magnesium component which can be magnesium oxide or magnesium hydroxide, and a carbonate component such as an alkali or alkaline earth carbonate in an aqueous medium at a temperature of 0°–150° C. at a pH of at least 8. These patents also discuss prior art procedures for preparing synthetic hydrotalcites which include the use of dry ice or ammonium carbonate as the carbonate source and using high temperatures and or elevated pressures.

Hydrotalcites which have needle-like crystalline structures are described in U.S. Pat. No. 4,351,814 to Miyata, these hydrotalcites being prepared by reaction of a basic magnesium compound in the form of needle-like crystals with an aluminum cation under conditions which do not cause a loss of the needle-like crystalline shape of the basic magnesium compound. The reaction is carried out under a reaction temperature of about 90°–150° C. These fibrous hydrotalcites are said to be useful as fire retardants for thermoplastic and thermosetting resins.

U.S. Pat. No. 4,629,626 of Miyata et al discloses a hydrothermally treated product useful for treating an iron deficiency, which compound has a hydrotalcite-like crystal structure and includes iron, magnesium, aluminum and water within the structure. This product is prepared by the reaction of an iron source such as ferrous chloride with aluminum chloride and sodium hydroxides.

U.S. Pat. No. 4,347,353 to Miyata et al discloses the use of a hydrotalcite to inhibit the corrosion-causing tendency and coloration of an olefin polymer which contains a halogen component.

U.S. Pat. No. 4,611,024 to Wolfe discloses a propylene polymer composition which contains a clarifier and a small amount of hydrotalcite to enhance the effect of the clarifier.

U.S. Pat. No. 4,085,088 to Miyata et al discloses a fire retarding thermoplastic composition which comprises a thermoplastic resin and a fire retarding amount of a hydrotalcite, the hydrotalcite being coated or uncoated with an anionic surface active agent. According to these inventors, the hydrotalcite must have a BET specific surface area of not more than 30 m²/g and a specific crystallite size in order to provide the fire retardant characteristics. U.S. Pat. No. 4,154,718, also to Miyata et al, discloses fire retardant thermoplastic compositions which comprise a thermoplastic synthetic resin, a magnesium-containing compound which can be a hydrotalcite, and a fire retardant assistant which can be an alkali metal chloride. U.S. Pat. No. 4,324,876 to Matsubura et al discloses the use of hydrotalcites as catalysts in the production of olefins.

There remains a need in the art, however, for improved hydrotalcites, novel methods for preparation of novel synthetic hydrotalcites and improvements in their characteristics as fire retardants.

DISCLOSURE OF THE INVENTION

It is accordingly one object of this invention to provide novel methods for the preparation of synthetic hydrotalcites.

A still further object of the invention is to provide modified synthetic hydrotalcites which have improved characteristics as fire retardant compositions.

Other objects and advantages of the present invention will become apparent as the description thereof proceeds.

In satisfaction of the foregoing objects and advantages, there is provided by this invention a modified synthetic hydrotalcite component which includes phosphate within the molecule, said modified synthetic hydrous talcite having the following empirical formula:

$$xMgO.Al_2O_3.yPO_4.zH_2O$$

wherein x, y and z are integers representing the number of moles present of each component.

This phosphate derivative of hydrotalcite improves usefulness of hydrotalcite as a flame retardant in plastic systems by providing char promotion characteristics to the resulting plastic composition. This modified hydrotalcite is prepared by the reaction of the source of magnesium, a source of aluminum, and a source of carbonate in an aqueous medium, to produce a hydrotalcite. This product is then reacted with phosphoric acid to produce the product.

BEST MODE FOR CARRYING OUT THE INVENTION

As indicated above, this application is directed to synthetic crystalline hydrotalcite which is a basic magnesium aluminocarbonate hydrate and which contains phosphate. In one embodiment of the present invention, there is provided a novel process for the preparation of synthetic hydrotalcites in the form of small platelets and in improved yields. According to this process, a source of magnesium, a source of aluminum, and a source of carbonate are reacted in a pressurized reactor at an elevated temperature to produce hydrotalcite. This hydrotalcite is then reacted with a source of phosphorus such as phosphoric acid is included in the basic reaction mixture to result in a modified hydrotalcite which contains phosphate within the molecule. It has been discovered that the phosphate derivatives of hydrotalcite improve the flame retardant characteristics, particularly when used in plastic systems by providing char promotion characteristics to the system.

The basic reaction for preparation of the synthetic hydrotalcite is an aqueous system which includes a source of magnesium, a source of aluminum, and a source of carbonate. The magnesium source may be selected from the group consisting of magnesium oxide, magnesium hydroxide, magnesium carbonate and other water soluble magnesium salts. Magnesium hydroxide is the preferred reactant as an aqueous slurry, preferably of about 40-60% solids.

The aluminum may be present as a suitable aluminum salt including aluminum hydroxide, aluminum carbonate, aluminum alcoholates, and other water soluble aluminum salts such as alkali metal aluminates, preferably sodium aluminate, and aluminum trihydrate. The preferred reactants are sodium aluminate as an aqueous solution or solid aluminum trihydrate.

The carbonate reactant is preferably present as alkali metal carbonate, alkali metal bicarbonates, alkaline earth metal bicarbonates, carbon dioxide, and mixtures thereof. Sodium bicarbonate is the preferred reactant.

These reactants are brought together in a closed reactor in an aqueous medium. The mixture is then heated at a temperature of about 150°-200° C. for 1 to 3 hours, after which the product is isolated by filtration and dried at an elevated temperature. The resulting hydrotalcite is easy to filter and the dried product is very friable. The resulting hydrotalcite has an average particle size equal to about one micron and the particle morphology is platelet in nature.

In the main embodiment of the invention, it has been discovered that reaction of this hydrotalcite with the addition of phosphoric acid results in the production of a modified hydrotalcite composition wherein the carbon dioxide component has been replaced by phosphate. The empirical formula for the phosphate derivative is as follows:

$$xMgO \cdot Al_2O_3 \cdot yPO_4 \cdot zH_2O.$$

In the reaction for preparation of the phosphate derivative, the basic reaction is carried out and the product isolated. The product is then reslurried in water and sufficient phosphoric acid solution is added to the reaction mixture to cause liberation of carbon dioxide. The amount of phosphoric acid to be added to the particular reaction is determined by the amount of carbon dioxide to be liberated from the mixture. A slight excess is preferably added. The resulting product does not contain any substantial amount of carbon dioxide. In this formula, x, y and z are integers representing the moles present of MgO, Po4, and H2O, respectively. Preferably x is 2.5 to 4.5, y is 1.0 to 2.0, and x is 7.0 to 10.0. The particle morphology of the phosphate component is platelet in nature wherein the small platelets present are about 1 micron in size.

The addition of the phosphoric acid to the mixture changes d spacing in the x-ray diffraction analysis of the hydrotalcite. Set forth below are the x-ray diffraction analyses of hydrotalcite and the phosphate derivative of this invention.

| Hydrotalcite | Phosphate Derivative |
| --- | --- |
| 7.75 | 8.62 |
| 3.89 | 4.28 |
| 2.59 | 2.58 |
| 2.30 | 2.53 |
| 1.53 | 1.52 |
| 1.50 | 1.50 |

It is thus apparent that the phosphate derivative is a distinct chemical product from synthetic hydrotalcite as known in the art.

The phosphate hydrotalcite produced according to the present invention is useful as a flame retardant in plastic systems such as in polypropylene. According to this invention it has been discovered that a UL-94VO burn rating can be attained for 55 to 60% filled propylene samples. The hydrotalcite is also useful as a smoke suppressant and an HCl scavenger in polyvinylchloride. The phosphate derivative of hydrotalcite adds the benefit in that it provides char promotion to the hydrotalcite flame retardant material. The small platelet morphology of the resulting products causes the product to be useful as a reinforcer in plastics and elastomers.

The following examples are presented to illustrate the invention but it is not to be considered as limited thereto. In the examples and throughout the specification, parts are by weight unless otherwise indicated.

EXAMPLE 1

A total of 1,594 grams of water, 250 grams of a Mg(OH)$_2$ slurry (55% solids), 240 grams of sodium aluminate solution (molar ratio of Na$_2$O/Al$_2$O$_3$=2.0) and 204 grams of NaHCO$_3$ was placed in a one gallon Parr reactor. The reactor was heated to 175° C. and held there for 2 hours. The product was isolated by filtration and dried at 105° C. The resulting hydrotalcite was easy to filter and the dry product was very friable.

The percent hydrotalcite by x-ray diffraction analysis equalled 98%. The molar ratios of the reactants are as follows:

|  | Molar Ratio |
| --- | --- |
| Mg(OH)$_2$ | 5.04 |
| Al$_2$O$_3$ | 1.00 |
| CO$_2$ | 5.13. |

The chemical analysis of the synthesized hydrotalcite is as follows:

| % MgO | 39.9 |
| --- | --- |
| % Al$_2$O$_3$ | 18.80 |
| % CO$_2$ | 7.3 |
| % H$_2$O | 33.7 |

From the above chemical analysis the following empirical formula can be derived:

$$5.4MgO \cdot Al_2O_3 \cdot 7CO_2 \cdot 10.2H_2O$$

EXAMPLE 2

The product from Example 1 was then reslurried in water and 20% phosphoric acid solution was added to the hydrotalcite reaction mixture. The acid was added until all of the carbon dioxide was liberated. The product was then filtered and dried. The chemical analysis of the isolated pigment is as follows:

| % MgO | 28.7 |
| --- | --- |
| % Al$_2$O$_3$ | 19.9 |
| % CO$_2$ | 22.6 |
| % H$_2$O | 32.0 |

The empirical formula for the phosphate derivative is as follows:

$$3.7MgO \cdot Al_2O_3 \cdot 1.2OPO_4 \cdot 8.5H_2O$$

As can be seen, only the $CO_2$ was driven off the molecule while the water was held. The particle morphology remained the same after the phosphoric acid addition (small platelets equal to one micron).

The addition of the phosphoric acid changed the d spacing in the x-ray diffraction analysis. Set forth below is the XRD analysis of the phosphate derivative:

| Phosphate Derivative |
| --- |
| 8.62 |
| 4.28 |
| 2.58 |
| 2.53 |
| 1.52 |
| 1.50 |

The invention has been described herein with reference to certain preferred embodiments. However, as obvious variations thereon will become apparent to those skilled in the art, the invention is not to be considered as limited thereto.

We claim:

1. A phosphate modified hydrotalcite of the following formula:

$$xMgO \cdot Al_2O_3 \cdot yPO_4 \cdot zH_2O$$

wherein, x, y and z are integers indicating the number of moles present of MgO, $PO_4$ and $H_2O$, respectively, said phosphate modified hydrotalcite having a particle morphology of platelets and an average particle size less than about 1 micron.

2. A phosphate modified hydrotalcite according to claim 1 which has the following d spacing in its x-ray diffraction analysis:

| d Å |
| --- |
| 8.62 |
| 4.28 |
| 2.58 |
| 2.53 |
| 1.52 |
| 1.50 |

3. A phosphate modified hydrotalcite according to claim 1 wherein x is 2.5 to 4.5, y is 1.0 to 2.0 and z is 7.0 to 10.0.

4. A phosphate modified hydrotalcite according to claim 1 wherein x is 3.7, y is 1.2 and z is 8.5.

* * * * *